United States Patent
Miao et al.

(10) Patent No.: US 12,414,014 B2
(45) Date of Patent: Sep. 9, 2025

(54) METHODS FOR COMMUNICATION, TERMINAL DEVICE, AND COMPUTER READABLE MEDIA

(71) Applicant: NEC CORPORATION, Tokyo (JP)

(72) Inventors: Zhaobang Miao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 395 days.

(21) Appl. No.: 17/924,278

(22) PCT Filed: Aug. 14, 2020

(86) PCT No.: PCT/CN2020/109327
§ 371 (c)(1),
(2) Date: Nov. 9, 2022

(87) PCT Pub. No.: WO2022/032671
PCT Pub. Date: Feb. 17, 2022

(65) Prior Publication Data
US 2023/0189081 A1 Jun. 15, 2023

(51) Int. Cl.
*H04W 28/26* (2009.01)
*H04W 72/02* (2009.01)
(Continued)

(52) U.S. Cl.
CPC .......... *H04W 28/26* (2013.01); *H04W 72/02* (2013.01); *H04W 72/0446* (2013.01); *H04W 72/25* (2023.01)

(58) Field of Classification Search
CPC ...... H04W 28/26; H04W 72/25; H04W 72/02
See application file for complete search history.

(56) References Cited

U.S. PATENT DOCUMENTS 11,653,340 B2 * 5/2023 Wang .................... H04L 5/0048
370/329
11,943,067 B2 * 3/2024 Cao ........................ H04W 72/21
(Continued)

FOREIGN PATENT DOCUMENTS

| CN | 110891289 A | 3/2020 |
|---|---|---|
| CN | 111294752 A | 6/2020 |
| WO | 2020/029067 A1 | 2/2020 |

OTHER PUBLICATIONS

Huawei, Hisilicon, "Remaining details of sidelink resource allocation mode 2", 3GPP TSG RAN WG1 Meeting #102-e, R1-2005798, 18 pgs., Aug. 17-28, 2020.
(Continued)

*Primary Examiner* — Shukri Taha
(74) *Attorney, Agent, or Firm* — Sughrue Mion, PLLC

(57) ABSTRACT

Embodiments of the present disclosure relate to devices, methods, devices and computer readable storage media for resource selection in a Vehicle to Everything (V2X) communication. The method comprises determining, at a terminal device, a resource reservation period for at least one sidelink transmission; and in accordance with a determination, based on the resource reservation period, that a reference resource associated with the at least one sidelink transmission is subsequent to a sensing window, determining, from a resource selection window of the terminal device, at least one further reference resource to be reserved for the at least one sidelink transmission based on the resource reservation period. In this way, the conflict of resource selection can be avoided and therefore the performance of the sidelink transmission can be improved.

18 Claims, 4 Drawing Sheets

(51) Int. Cl.
*H04W 72/0446* (2023.01)
*H04W 72/25* (2023.01)

(56) References Cited

U.S. PATENT DOCUMENTS

| | | | |
|---|---|---|---|
| 2020/0029245 A1* | 1/2020 | Khoryaev | H04W 36/22 |
| 2022/0394560 A1* | 12/2022 | Yu | H04W 72/0446 |
| 2022/0400484 A1* | 12/2022 | Lee | H04W 72/02 |
| 2023/0156670 A1* | 5/2023 | Yoon | H04W 72/02 370/329 |

OTHER PUBLICATIONS

3rd Generation Partnership Project "Physical layer procedures for data" 3GPP TS 38.214 V16.2.0, Jun. 30, 2020, 167 pgs.
International Search Report for CN/2020/109327 dated, May 8, 2021 (PCT/ISA/210).
Written Opinion of the International Searching Authority for PCT/CN2020/109327 (PCT/ISA/237).

* cited by examiner

METHODS FOR COMMUNICATION, TERMINAL DEVICE, AND COMPUTER READABLE MEDIA

CROSS REFERENCE TO RELATED APPLICATIONS

This application is a National Stage of International Application No. PCT/CN2020/109327 filed Aug. 14, 2020.

FIELD

Embodiments of the present disclosure generally relate to the field of telecommunication and in particular, to devices, methods, devices and computer readable storage media for resource selection in a Vehicle to Everything (V2X) communication.

BACKGROUND

In resource allocation mode 2 of the V2X communication, the higher layer can request the User Equipment (UE) to determine a subset of resources from which the higher layer will select resources for Physical Sidelink Shared Channel (PSSCH)/Physical Sidelink Control Channel (PSCCH) transmission.

The UE may perform a sensing procedure at a time slot at which a trigger is received from the higher layer. In the sensing procedure, the UE may monitor each slot within the sensing window to identify resources which are occupied and exclude them from the resource selection window.

The remaining resources in the selection window can be determined by the UE as a subset of resources and reported to the higher layer for the resource selection.

SUMMARY

In general, example embodiments of the present disclosure provide a solution for resource selection in a V2X communication.

In a first aspect, there is provided a method for communications. The method comprises determining, at a terminal device, a resource reservation period for at least one sidelink transmission; and in accordance with a determination, based on the resource reservation period, that a reference resource associated with the at least one sidelink transmission is subsequent to a sensing window, determining, from a resource selection window of the terminal device, at least one further reference resource to be reserved for the at least one sidelink transmission based on the resource reservation period.

In a second aspect, there is provided a terminal device. The terminal device comprises a processor and a memory storing instructions. The memory and the instructions are configured, with the processor, to cause the terminal device to perform the method according to the first aspect.

In a third aspect, there is provided a computer readable medium having instructions stored thereon. The instructions, when executed on at least one processor of a device, cause the device to perform the method according to the first aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
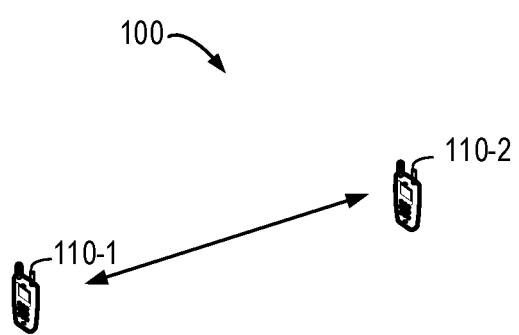
FIG. 1 illustrates an example environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. The network 100 includes terminal devices 110-1 and 110-2. Hereinafter, the terminal device 110-1 may be referred to as a first UE 110-1 and the terminal device 110-2 may be referred to a second UE 110-2. The terminal devices 110-1 and 110-2 may communicate with each other. It is to be understood that the number of terminal devices is only for the purpose of illustration without suggesting any limitations. The network 100 may include any suitable number of terminal devices adapted for implementing embodiments of the present disclosure.

The communication network 100 can be implemented in a scenario of V2X communication. As mentioned above, V2X communication can be divided into four types, including Vehicle-to-Vehicle (V2V), Vehicle-to-Pedestrian (V2P), Vehicle-to-Infrastructure (V2I), Vehicle-to-Network (V2N). Communication between terminal devices (that is, V2V, V2P, V2I communications) can be performed via sidelinks. For sidelink-based V2X communication, information may be transmitted from a Transmit (TX) terminal device to one or more Receive (RX) terminal devices in a broadcast, or groupcast, or unicast manner.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

As mentioned above, in resource allocation mode 2 of the V2X communication, the higher layer can request the User Equipment (UE) to determine a subset of resources from which the higher layer will select resources for Physical Sidelink Shared Channel (PSSCH)/Physical Sidelink Control Channel (PSCCH) transmission.

The UE may perform a sensing procedure at a time slot at which a trigger is received from the higher layer. In the sensing procedure, the UE may monitor each slot within the sensing window to identify resources which are occupied and exclude them from the resource selection window. The remaining resources in the selection window can be determined by the UE as a subset of resources and reported to the higher layer for the resource selection.

In Long Term Evolution (LTE), the end of sensing window for the sensing procedure is always followed by the sensing trigger slot. However, in New Radio (NR), there may be a set of slots between the sensing window and the sensing trigger slot.

In a convention way, if a UE (for example the first UE 110-1 as shown in FIG. 1) determines, based on a result of the sensing procedure, a resource to be reserved for a transmission of a further UE (for example the second UE 110-2 as shown in FIG. 1) is located in a range of the set of slots between the sensing window and the sensing trigger slot, the UE may not consider whether at least one resource within the resource selection window of the UE is also to be reserved by the further UE, which may cause a conflict of the resource selection between the UE and the further UE.

Therefore, the present disclosure proposes a solution for resource selection in a V2X communication. In this solution, the UE may determine a resource reservation period for at least one sidelink transmission. If the UE determines a resource associated with the at least one sidelink transmission is subsequent to a sensing window, the UE may determine one or more further resources associated with the at least one sidelink transmission to be reserved from the resource selection window of the UE based on the resource reservation period. In this way, the conflict of resource selection can be avoided and therefore the performance of the sidelink transmission can be improved.

Figure 2:
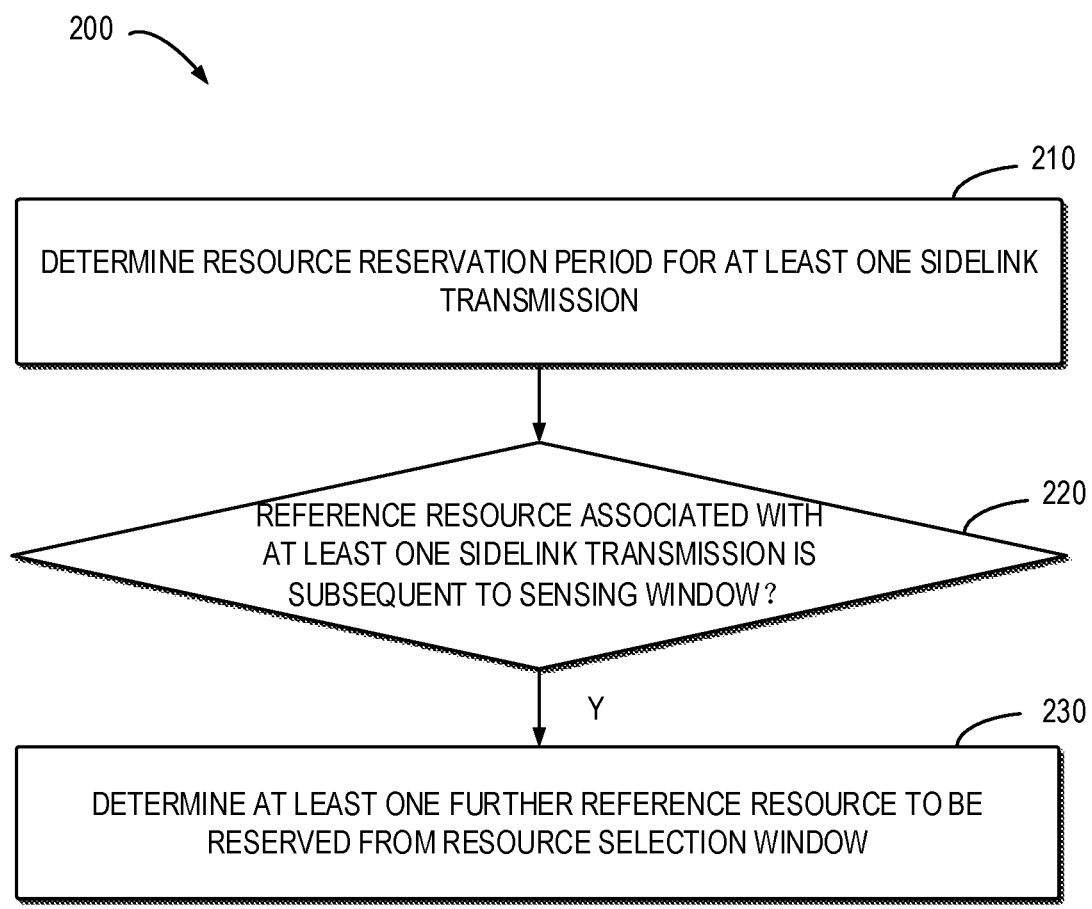
FIG. 2 shows flowchart of an example method for resource selection according to some example embodiments of the present disclosure.

Principle and implementations of the present disclosure will be described in detail below with reference to FIG. 2. FIG. 2 shows a flowchart of an example method 200 of resource selection according to some example embodiments of the present disclosure. The method 200 can be implemented at the terminal device 110-1 as shown in FIG. 1. For the purpose of discussion, the method 200 will be described with reference to FIG. 1.

At 210, the terminal device 110-1 determines a resource reservation period for at least one sidelink transmission.

In some example embodiments, the terminal device 110-1 may be triggered to perform a sensing procedure. In the sensing procedure, the terminal device 110-1 may monitor each slot in a sensing window and measure, for example, reference signal receiving power associated with at least one sidelink transmission, for example, a sidelink transmission of the further terminal device 110-2. In the sensing procedure, the terminal device 110-1 may also receive/decode Sidelink Control Information (SCI) associated with at least one sidelink transmission. The SCI may comprise "Resource reservation period" field. In some example embodiments, the terminal device 110-1 may determine a resource reservation period from the received SCI.

In some example embodiments, the SCI may not be received by the terminal device 110-1. For example, the terminal device 110-1 may perform an Uplink (UL) or sidelink transmission in a time interval within the sensing window and therefore it is impossible to monitor each slot in the sensing window for obtaining the SCI. However, the terminal device 110-1, in some example embodiments, may also obtain the resource reservation period via a higher layer signaling. For example, the resource reservation period may equal each interval of an interval set configured by higher layer parameter per resource pool. The terminal device 110-1 may assume that there are other terminal devices sending SCI with the entire possible reservation interval. The reservation interval can also be considered as a reservation period.

At 220, if the terminal device 110-1 determines a reference resource associated with the at least one sidelink transmission is subsequent to the sensing window, then at 230, the terminal device 110-1 may determine at least one further resource to be reserved for the at least one sidelink transmission from the resource selection window of the terminal device 110-1 based on the resource reservation period.

In some example embodiments, the terminal device 110 may determine the location of the reference resource associated with the at least one sidelink transmission in the time domain. For example, the terminal device 110 may determine the time point at which the sidelink control information is obtained by the terminal device 110-1 and determine the location of the reference resource in the time domain based on the time point at which the sidelink control information is obtained and the resource reservation period. For example, the location of the reference resource in the time domain may correspond to the time point at which the sidelink control information is obtained plus the resource reservation period.

There may be a set of slots between the sensing window end slot and a slot at which the sensing procedure is triggered (hereinafter may also be referred to as the sensing trigger slot). Such slots may be referred to as processing time. As another option, such slots may also be referred to as processing time.

In some example embodiments, if the terminal device 110-1 determines the location of the reference resource associated with the at least one sidelink transmission in the time domain is within a range of the processing slots, the terminal device 110-1 may determine at least one further resource to be reserved for the at least one sidelink transmission from the resource selection window of the terminal device 110-1 based on the resource reservation period.

In some example embodiments, the location of the sensing window end slot, i.e. the last slot of the sensing window, can be configured by the sensing trigger slot and an offset $T_{proc,0}^{SL}$, i.e. the processing slots. For example, the sensing window end slot can be determined by:

$$t_{sensing\_end} = t_n^{SL} - T_{proc,0}^{SL} \quad (1)$$

wherein $t_n^{SL}$ represents sensing trigger slot, $T_{proc,0}^{SL}$ represents the offset, and $t_{sensing\_end}$ represents sensing window end slot.

In some example embodiments, $T_{proc,0}^{SL}$ can be defined in slots where $\mu_{SL}$ is the Subcarrier Spacing (SCS) configuration of the Sidelink Bandwidth Part (SL BWP). For example, ($\mu_{SL}$, $T_{proc,0}^{SL}$ [slots])=(0,1) (1,1) (2,2) (3,4) and also (4,8) (5,16) (6,32) (7,64).

The relationship between the offset $T_{proc,0}^{SL}$ and the SCS configuration of SL BWP $\mu_{SL}$ can be shown as below.

TABLE 1 relationship between $T_{proc,0}^{SL}$ and $\mu_{SL}$

| $\mu_{SL}$ | $T_{proc,0}^{SL}$ |
|---|---|
| 0 | 1 |
| 1 | 1 |
| 2 | 2 |
| 3 | 4 |
| 4 | 8 |
| ... | ... |

Figure 3A:
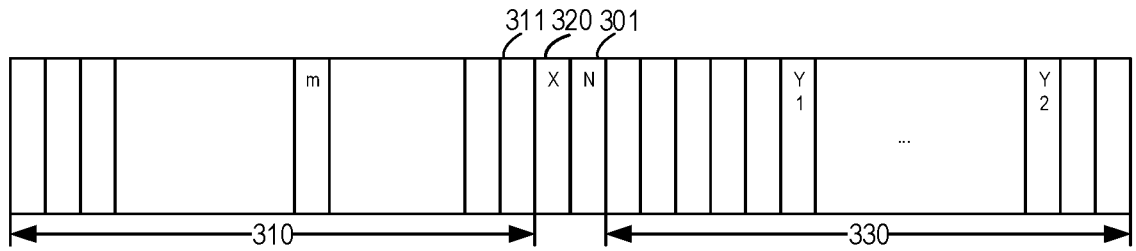
FIGS. 3A-3C show examples of the configured processing slots according to some example embodiments of the present disclosure.
Figure 3B:
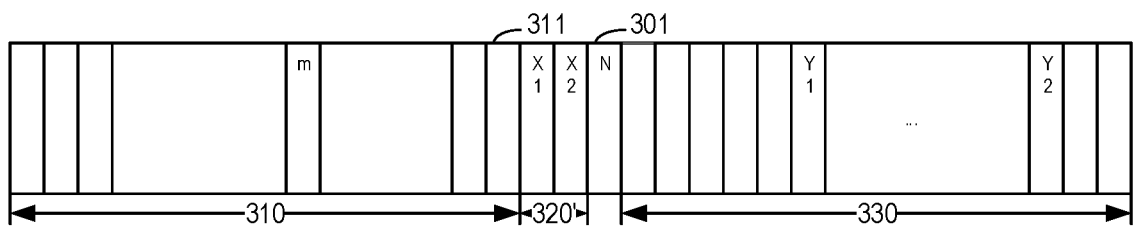
Figure 3C:
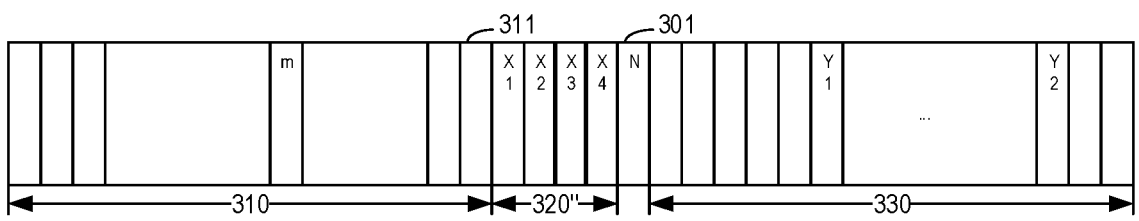

FIGS. 3A-3C show examples of the configured processing slots according to some example embodiments of the present disclosure. In a case where $\mu_{SL}=0, 1$, $T_{proc,0}^{SL}=1$, as shown FIG. 3A, a single processing slot 320 is located after the sensing window end slot 311 and before the sensing trigger slot 301. In a case where $\mu_{SL}=2$, $T_{proc,0}^{SL}=2$, as shown FIG. 3B, a range 320' for processing slots including two processing slots is located after the sensing window end slot 311 and before the sensing trigger slot 301. In a case where $\mu_{SL}=2$, $T_{proc,0}^{SL}=4$, as shown FIG. 3C, a range 320" for processing slots including four processing slots is located after the sensing window end slot 311 and before the sensing trigger slot 301.

In some example embodiments, the terminal device 110-1 may further determine the respective locations of the at least one further resource to be reserved for the at least one sidelink transmission in the resource selection window of the terminal device 110-1. The configuration of the resource selection window of the terminal device 110-1 can be transmitted to the terminal device 110-1 via a higher layer signalling. For example, the resource selection window is the slot range of $[n+T_1, n+T_1]$ where n is the sensing trigger slot and $T_1$ and $T_2$ is the start slot and end slot of the window with respect to slot n.

For determining in which slots of the resource selection window the resources may be reserved for the at least one sidelink transmission, the terminal device 110-1 may determine the number of the at least one further resource to be reserved.

In some example embodiments, the terminal device 110-1 may determine a range of candidate resources available for the at least one sidelink transmission. The range of the candidate resources can be represented as $T_{scal}$. The range of the candidate resources $T_{scal}$ may comprise the processing slots and the size of the resource selection window which starts from sensing trigger slot to selection window ending slot n+T2. That is, $T_{scal}=T_{proc,0}^{SL}+T_2$, or $T_{scal}=T_{proc,0}^{SL}+T_2+1$ where $T_2$ is the selection window size with respect to sensing trigger slot. The number of at least one resource to be reserved for the at least one sidelink transmission may be determined based on the range of candidate resources available for at least one sidelink transmission and the resource reservation period. In some example embodiments, $T_{scal}$ should be converted to units of ms.

In some example embodiments, the number of at least one resource to be reserved for the at least one sidelink transmission can be determined by:

$$Q = \left\lceil \frac{T_{scal}}{P} \right\rceil ; \text{ or} \quad (2)$$

$$Q = \left\lceil \frac{T_{scal}}{\max(p\_min, P)} \right\rceil \quad (3)$$

where Q may represent the number of at least one resource to be reserved for the at least one sidelink transmission, P may represent the resource reservation period.

In some example embodiments, p_min can be 20 ms or 10 ms. Based on the number of at least one resource to be reserved for the at least one sidelink transmission Q, the terminal device 110-1 may determine the number of the further resources to be reserved in the resource selection window of the terminal device 110-1. For example, if Q=3 and the first resource to be reserved for the at least one sidelink transmission is located in the range of processing slots, the number of the further resources to be reserved in the resource selection window of the terminal device 110-1 should be 2.

Then the terminal device 110-1 may determine resources to be excluded from the resource selection window of the terminal device 110-1 when the terminal device 110-1 selects the resources for performing a sidelink transmission. For example, if the terminal device 110-1 determines a receiving power level of the at least one sidelink transmission in the associated resource exceeds a threshold level, the terminal device 110-1 may exclude resources from the resource selection window which belongs to the at least one further reference resource to be reserved.

In this way, possible resources to be reserved by the sidelink transmissions of other terminal device can be excluded from the resource selection window of the terminal device 110-1. The conflict of resource selection can be avoided and therefore the performance of the sidelink transmission can be improved.

Figure 4:
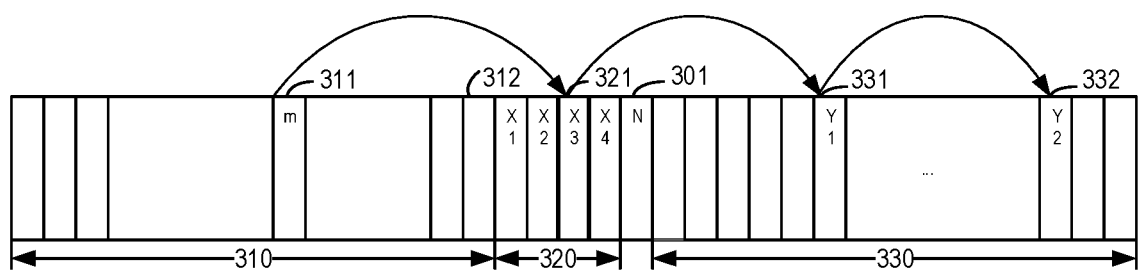
FIG. 4 shows a sequence diagram of resource allocation for a V2X communication according to some example embodiments of the present disclosure.

FIG. 4 shows a sequence diagram of resource allocation for a V2X communication according to some example embodiments of the present disclosure. With reference to FIG. 4, the solution of the present disclosure may be further described in detail.

As shown in FIG. 4, at slot 301 (which may be represented as slot n), the terminal device 110-1 may be triggered to perform a sensing procedure within the sensing window 310. For example, if the terminal device 110-1 receives the SCI indicating a resource reservation period P (which may be represented as $P_{rsvp\_RX}$) at the slot 311 (which may be represented as slot m), the terminal device 110-1 may determine one or more resources for at least one sidelink transmission of a further terminal device to be excluded in a range of $T_{scal}$, which may be determined by the range 320 of the processing slots $T_{proc,0}^{SL}$ and the range 330 of the resource selection window and slot 301 in some cases, based on the location of the slot m and the resource reservation period $P_{rsvp\_RX}$, since the resources may be reserved periodically.

The range 320 of the processing slots $T_{proc,1}^{SL}$ can be located after the sensing window end slot 312 and before sensing trigger slot 301, as shown in FIG. 4. The location of the one or more resources in the time-domain can be represented as $t_{m+q \times P'_{rsvp\_RX}}^{SL}$, with q=1, 2, ..., Q. $P'_{rsvp\_RX}$ is $P_{rsvp\_RX}$ converted to units of logical slots, $$Q = \left\lceil \frac{T_{scal}}{P_{rsvp\_RX}} \right\rceil$$

if $P_{rsvp\_RX} < T_{scal}$ and $n'-m \leq P'_{rsvp\_RX}$.

In some example embodiments, $$Q = \left\lceil \frac{T_{scal}}{P_{rsvp\_RX}} \right\rceil$$

if $P_{rsvp\_RX} < T_{scal}$ and $n'-m \leq P'_{rsvp\_RX}$, where $t_{n'}^{SL}=n-T_{proc,0}^{SL}$ if slot $n-T_{proc,0}^{SL}$ belongs to the set $(t_0^{SL}, t_1^{SL}, \ldots t_{T_{max}}^{SL})$, otherwise slot $t_{n'}^{SL}$ is the first slot after slot $n-T_{proc,0}^{SL}$ belonging to the set $(t_0^{SL}, t_1^{SL}, \ldots t_{T_{max}}^{SL})$; otherwise Q=1. $T_{scal}$ is set to selection window size $T_2$ converted to units of ms plus $T_{proc,0}^{SL}$ converted to units of ms.

It is also possible that $$Q = \left\lceil \frac{T_{scal}}{P_{rsvp\_RX}} \right\rceil$$

if $P_{rsvp\_RX} < T_{scal}$ and $n'-T_{proc,0}^{SL}-m \leq P'_{rsvp\_RX}$, where $t_{n'-T_{proc,0}^{SL}}^{SL}=n-T_{proc,0}^{SL}$ if slot $n-T_{proc,0}^{SL}$ belongs to the set $(t_0^{SL}, t_1^{SL}, \ldots t_{T_{max}}^{SL})$, otherwise slot $t_{n'-T_{proc,0}^{SL}}^{SL}$ is the first slot after slot $n-T_{proc,0}^{SL}$ to the set $(t_0^{SL}, t_1^{SL}, \ldots t_{T_{max}}^{SL})$; otherwise Q=1. $T_{scal}$ is set to selection window size $T_2$ converted to units of ms plus $T_{proc,0}^{SL}$ converted to units of ms.

For example, as shown in FIG. 4, the terminal device 110-1 may determine the slots 321, 331 and 332 as resources for at least one sidelink transmission of a further terminal device. It can be seen from FIG. 4 that the slots 331 and 332 are located in the range 330 from slot 301 of the resource selection window. The terminal device 110-1 may exclude the resources corresponding to the slots 331 and 332 from the resource selection window when the terminal device 110-1 select available resources from the resource selection window, for example, for a sidelink transmission.

In the solution of the resource allocation for a sidelink transmission according to some example embodiments of the present disclosure, the following steps can be used.

In step 1, a candidate single-slot resource for transmission $R_{x,y}$ is defined as a set of $L_{subCH}$ (which may refer to the number of sub-channels to be used for the PSSCH/PSCCH transmission in a slot) contiguous sub-channels with sub-channel x+j in slot $t_y^{SL}$ where j=0, ..., $L_{subCH}-1$. The terminal device may assume that any set of $L_{subCH}$ contiguous sub-channels included in the corresponding resource pool within the time interval $[n+T_1, n+T_2]$ correspond to one candidate single-slot resource where selection of $T_1$ is up to UE implementation under $0 \leq T_1 \leq T_{proc,1}^{SL}$, where $T_{proc,1}^{SL}$ is defined in slots in Table 1 as shown above where $\mu_{SL}$ is the SCS configuration of the SL BWP and if $T_{2\ min}$ is shorter than the remaining packet delay budget (in slots) then $T_2$ is up to UE implementation subject to $T_{2\ min} \leq T_2 \leq$ remaining packet budget (in slots); otherwise $T_2$ is set to the remaining packet delay budget (in slots). The total number of candidate single-slot resources is denoted by $M_{total}$.

In step 2, the sensing window is defined by the range of slots $[n-T_0, n-T_{proc,0}^{SL})$ where $T_{proc,0}^{SL}$ is defined in slots in Table 1 as shown above where $\mu_{SL}$ is the SCS configuration of the SL BWP. The terminal device may monitor slots which can belong to a sidelink resource pool within the sensing window except for those in which its own transmissions occur. The terminal device may perform the behavior in the following steps based on PSCCH decoded and RSRP measured in these slots.

In step 3, The internal parameter $Th(p_i)$ is set to the corresponding value from higher layer parameter SL-ThresRSRP_pi_pj for $p_j$ equal to the given value of $prio_{TX}$ and each priority value $p_i$. In step 4, the set $S_A$ is initialized to the set of all the candidate single-slot resources.

In step 5, the terminal device may exclude any candidate single-slot resource $R_{x,y}$ from the set $S_A$ if it meets all the following conditions: the terminal device has not monitored slot $t_m^{SL}$ in Step 2 and for any periodicity value allowed by the higher layer parameter sl-ResourceReservePeriodList and a hypothetical SCI format 1-A received in slot $t_m^{SL}$ with "Resource reservation period" field set to that periodicity value and indicating all subchannels of the resource pool in this slot, condition c in step 6 would be met.

In step 6, the terminal device may exclude any candidate single-slot resource $R_{x,y}$ from the set $S_A$ if it meets all the following conditions: a) the terminal device receives an SCI format 1-A in slot $t_m^{SL}$, and "Resource reservation period" field, if present, and "Priority" field in the received SCI format 1-A indicate the values $P_{rsvp\_RX}$ and $prio_{RX}$; b) the RSRP measurement performed for the received SCI format 1-A, is higher than $Th(prio_{RX})$; and c) the SCI format received in slot $t_m^{SL}$ or the same SCI format which, if and only if the "Resource reservation period" field is present in the received SCI format 1-A, is assumed to be received in slot(s) $t_{m=q \times P'_{rsvp\_RX}}^{SL}$ determines the set of resource blocks and slots which overlaps with $R_{x,y+j \times P'_{rsvp\_TX}}$ for q=1, 2, ..., Q and j=0, 1, ..., $C_{resel}-1$. Here, $P'_{rsvp\_RX}$ is $P_{rsvp\_RX}$ converted to units of logical slots, $$Q = \left\lceil \frac{T_{scal}}{P_{rsvp\_RX}} \right\rceil$$

if $P_{rsvp\_RX} < T_{scal}$ and $n'-m \leq P'_{rsvp\_RX}$, where $t_{n'}^{SL}=n-T_{proc,0}^{SL}$ if slot $n-T_{proc,0}^{SL}$ belongs to the set $(t_0^{SL}, t_1^{SL}, \ldots t_{T_{max}}^{SL})$, otherwise slot $t_{n'}^{SL}$ is the first slot after slot $n-T_{proc,0}^{SL}$ belonging to the set $(t_0^{SL}, t_1^{SL}, \ldots t_{T_{max}}^{SL})$; otherwise Q=1. $T_{scal}$ is set to selection window size $T_2$ converted to units of ms plus $T_{proc,0}^{SL}$ converted to units of ms. As another option, $T_{scal}$ is set to selection window size T2 converted to units of ms plus $T_{proc,0}^{SL}+1$ converted to units of ms.

For condition (c), It is also possible that $$Q = \left\lceil \frac{T_{scal}}{P_{rsvp\_RX}} \right\rceil$$

if $P_{rsvp\_RX} < T_{scal}$ and $n'-T_{proc,0}^{SL}-m \leq P'_{rsvp\_RX}$, where $t_{n'-T_{proc,0}^{SL}}^{SL}=n-T_{proc,0}^{SL}$ if slot $n-T_{proc,0}^{SL}$ belongs to the set $(t_0^{SL}, t_1^{SL}, \ldots t_{T_{max}}^{SL})$, otherwise slot $t_{n'-T_{proc,0}^{SL}}^{SL}$ is the first slot after slot $n-T_{proc,0}^{SL}$ belonging to the set $(t_0^{SL}, t_1^{SL}, \ldots t_{T_{max}}^{SL})$; otherwise Q=1. $T_{scal}$ is set to selection window size $T_2$ converted to units of ms plus $T_{proc,0}^{SL}$ converted to units of ms. As another option, $T_{scal}$ is set to selection window size T2 converted to units of ms plus $T_{proc,0}^{SL}+1$ converted to units of ms.

In step 7, if the number of candidate single-slot resources remaining in the set $S_A$ is smaller than $X \cdot M_{total}$, then $Th(p_i)$ is increased by 3 dB for each priority value $Th(p_i)$ and the procedure continues with step 4.

After steps 1-7 is performed, the terminal device may report set $S_A$ to higher layers.

Figure 5:
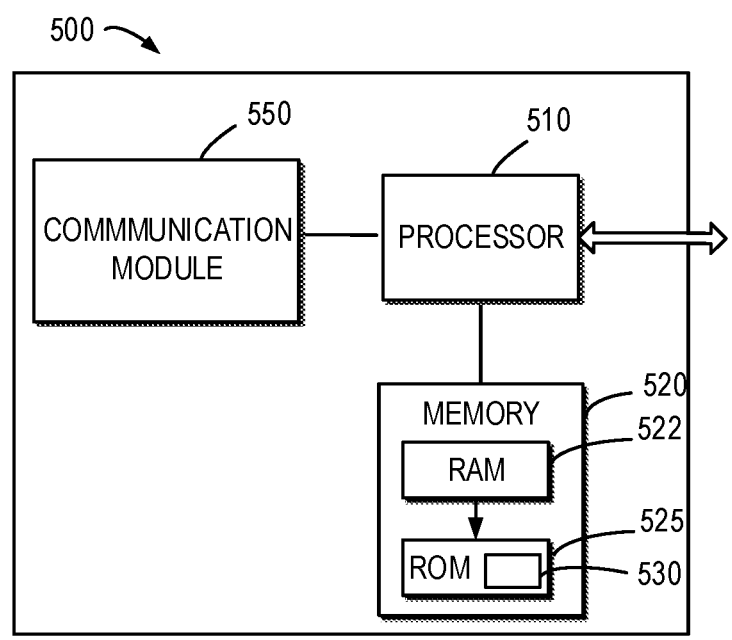
FIG. 5 shows a simplified block diagram of a device that is suitable for implementing example embodiments of the present disclosure.

In some example embodiments, if the terminal device determines a slot, which was determined as reserved from a slot m within the sensing window with the same interval P, is within the range of $[n-T_{proc,0}^{SL},n)$, the terminal device may perform additional sensing within $[n-T_{proc,0}^{SL},q\ n-t_{offset})$, where $t_{offset}=0, 1, \ldots$, which is $< T_{proc,0}^{SL}$ and $T_2=T_2-T_{proc,0}^{SL}$ to reduce the length of selection window FIG. 5 is a simplified block diagram of a device 500 that is suitable for implementing embodiments of the present disclosure. The device 500 may be provided to implement the communication device, for example the terminal device 110-1 and 110-2 as shown in FIG. 1. As shown, the device 500 includes one or more processors 510, one or more memories 540 coupled to the processor 510, and one or more transmitters and/or receivers (TX/RX) 540 coupled to the processor 510.

The TX/RX 540 is for bidirectional communications. The TX/RX 540 has at least one antenna to facilitate communication. The communication interface may represent any interface that is necessary for communication with other network elements.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the ROM 520. The processor 510 may perform any suitable actions and processing by loading the program 530 into the RAM 520.

The embodiments of the present disclosure may be implemented by means of the program 530 so that the device 500 may perform any process of the disclosure as discussed with reference to FIGS. 2 to 4. The embodiments of the present disclosure may also be implemented by hardware or by a combination of software and hardware.

In some embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. The computer readable medium may include any types of tangible non-volatile storage, such as ROM, EPROM, a flash memory, a hard disk, CD, DVD, and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 200 as described above with reference to FIG. 2. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for communication comprising:
  determining, at a terminal device, a resource reservation period for at least one sidelink transmission;
  in accordance with a determination, based on the resource reservation period, that a reference resource associated with the at least one sidelink transmission is subsequent to a sensing window, determining, from a resource selection window of the terminal device, at least one further reference resource to be reserved for the at least one sidelink transmission based on the resource reservation period;
  determining a location of the reference resource in the time-domain;
  determining the number of the at least one further reference resource to be reserved; and
  determining a further location of the at least one further reference resource on the time-domain based on the location of the reference resource and the number of the at least one further reference resource.

2. The method of claim 1, wherein determining the resource reservation period comprises:
  receiving sidelink control information at a reference time point within the sensing window; and
  determining the resource reservation period based on the sidelink control information.

3. The method of claim 1, wherein determining the resource reservation period comprises:
  obtaining the resource reservation period via a higher layer signaling.

4. The method of claim 1, wherein determining the location comprises:
  determining a reference time point at which the sidelink control information is obtained by the terminal device; and
  determining the location of the reference resource based on the reference time point and the resource reservation period.

5. The method of claim 1, wherein determining the at least one further reference resource comprises:
  in accordance with a determination that the reference resource is located in a range from an end of the sensing window to a further reference time point, determining the at least one further reference resource to be reserved for the at least one sidelink transmission based on the resource reservation period, the sensing of the sidelink control information is triggered at the further reference time point in the time-domain.

6. The method of claim 5, further comprising:
  determining the further reference time point at which the sensing of the sidelink control information is triggered;
  determining an offset associated with a subcarrier spacing configuration of a sidelink bandwidth part of the terminal device; and
  determining the end of the sensing window based on the further reference time point and the offset.

7. The method of claim 6, wherein the end of the sensing window is determined by:

$$t_{sensing\_end} = t_n^{SL} - T_{proc,0}^{SL}$$

wherein $t_n^{SL}$ represents the further reference time point, $T_{proc,0}^{SL}$ represents the offset, and $t_{sensing\_end}$ represents the end of the sensing window.

8. The method of claim 1, wherein determining the number of the at least one further reference resource comprises: determining a range of candidate resources available for the at least one sidelink transmission based on an offset associated with a subcarrier spacing configuration of a sidelink bandwidth part of the terminal device and the resource selection window; and determining the number of the at least one further reference resource based on the range of candidate resources and the resource reservation period.

9. The method of claim 1, further comprising:
  in accordance with a determination that a receiving power level of the at least one sidelink transmission exceeds a threshold level, excluding resources from the resource selection window which belongs to the at least one further reference resource to be reserved.

10. The method of claim 1, further comprising:
  in accordance with a determination that the resource reservation period is obtained from sidelink control information received at a reference time point within the sensing window, excluding, based on the resource reservation period, the at least one further reference resource to be reserved for the at least one sidelink transmission from a set of available resources for the terminal device within the resource selection window.

11. A terminal device, comprising:
  a processor, and
  a memory storing instructions,
  the memory and the instructions being configured, with the processor, to cause the terminal device to:
    determine, at a terminal device, a resource reservation period for at least one sidelink transmission;
    in accordance with a determination, based on the resource reservation period, that a reference resource associated with the at least one sidelink transmission is subsequent to a sensing window, determine, from a resource selection window of the terminal device, at least one further reference resource to be reserved for the at least one sidelink transmission based on the resource reservation period;
    determine a location of the reference resource in the time-domain;
    determine the number of the at least one further reference resource to be reserved; and
    determine a further location of the at least one further reference resource on the time-domain based on the location of the reference resource and the number of the at least one further reference resource.

12. The terminal device of claim 11, wherein the terminal device is caused to determine the resource reservation period by:
  receiving sidelink control information at a reference time point within the sensing window; and
  determining the resource reservation period based on the sidelink control information.

13. The terminal device of claim 11, wherein the terminal device is caused to determine the resource reservation period by:
  obtaining the resource reservation period via a higher layer signaling.

14. The terminal device of claim 11, wherein the terminal device is caused to determine location by:
  determining a reference time point at which the sidelink control information is obtained by the terminal device; and
  determining the location of the reference resource based on the reference time point and the resource reservation period.

15. The terminal device of claim 11, wherein the terminal device is caused to determine the at least one further reference resource by:
  in accordance with a determination that the reference resource is located in a range from an end of the sensing window to a further reference time point, determining the at least one further reference resource to be reserved for the at least one sidelink transmission based on the resource reservation period, the sensing of the sidelink control information is triggered at the further reference time point in the time-domain.

16. The terminal device of claim 11, wherein the terminal device is further caused to:
  in accordance with a determination that a receiving power level of the at least one sidelink transmission exceeds a threshold level, exclude resources from the resource selection window which belongs to the at least one further reference resource to be reserved.

17. The terminal device of claim 11, wherein the terminal device is further caused to:
  in accordance with a determination that the resource reservation period is obtained from sidelink control information received at a reference time point within the sensing window, exclude, based on the resource reservation period, the at least one further reference resource to be reserved for the at least one sidelink transmission from a set of available resources for the terminal device within the resource selection window.

18. A non-transitory computer readable medium comprising program instructions for causing an apparatus to:
  determine, at a terminal device, a resource reservation period for at least one sidelink transmission;
  in accordance with a determination, based on the resource reservation period, that a reference resource associated with the at least one sidelink transmission is subsequent to a sensing window, determine, from a resource selection window of the terminal device, at least one further reference resource to be reserved for the at least one sidelink transmission based on the resource reservation period;
  determine a location of the reference resource in the time-domain;
  determine the number of the at least one further reference resource to be reserved; and
  determine a further location of the at least one further reference resource on the time-domain based on the location of the reference resource and the number of the at least one further reference resource.

* * * * *